350-96.24 SR
XR 3,827,075
SEARCH ROOM

United S

Baycura

SUBSTITUTE FOR MISSING XR

[11] 3,827,075

[45] July 30, 1974

[54] SOLID STATE TELEVISION CAMERA

[76] Inventor: Orestes M. Baycura, 2238 Central Park Dr., Campbell, Calif. 95008

[22] Filed: July 9, 1973

[21] Appl. No.: 377,668

[52] U.S. Cl. .................. 358/41, 178/7.1, 178/7.6, 178/DIG. 2

[51] Int. Cl. .................. H04n 9/04

[58] Field of Search .............. 178/5.2, 5.4, 7.1, 7.6, 178/DIG. 2

[56] References Cited

UNITED STATES PATENTS

| | | | |
|---|---|---|---|
| 3,430,057 | 2/1969 | Genahr | 178/DIG. 2 |
| 3,617,931 | 11/1971 | Pinnow et al. | 178/7.6 |
| 3,633,996 | 1/1972 | Lean et al. | 178/7.6 |

*Primary Examiner*—Richard Murray
*Attorney, Agent, or Firm*—R. S. Sciascia; Charles D. B. Curry

[57] ABSTRACT

A solid state television camera wherein the light from an object is focused on a plurality of bundles of optical fibers. The optical fibers on each bundle are respectively connected to the light responsive face of a plurality of photo-piezoelectric effect transducer crystals. Each crystal is activated by sound source located at one end of the crystal. As the sound wave travels down the length of a crystal, a voltage occurs across the crystal that is proportional to the light from the particular optical fiber when the travelling sound wave is coincident with that particular optical fiber. As the sound wave travels down the crystal a plurality of electrical pulses of varying amplitude in proportion to light intensity, sequentially appear across the crystal that represent one horizontal sweep of the object. A plurality of sweeps may be successively or simultaneously taken of the object by the remaining bundles and corresponding crystals that constitute an electrical representation of the object which may be then transmitted to a distant television receiver.

10 Claims, 6 Drawing Figures

SOLID STATE TELEVISION CAMERA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention.

The present invention relates to a television camera and more particularly to a television camera that converts light signals to electrical signals for application and transmission to a distant receiver.

2. Description of the Prior Art.

Present television cameras use an electron beam to convert light to electrical signals. These cameras employ a large vacuum tube containing an electron gun at one end and a static light activated electron emitting surface at the other end. In operation, light enters the vacuum space and causes electrons to be emitted from the static emitting surface in proportion to the light intensity. When the electron gun is activated, it emits electrons that are accelerated toward the static light activated electron surface. When the accelerated electrons meet the static electrons, repulsion occurs and the repulsed electrons are drawn to a positive plate where they are collected and amplified for further transmission. The disadvantage of this type camera is that it requires a vacuum, is bulky, fragile, and the electron gun source is exhausted after several hundred hours of operation. The present invention overcomes these disadvantages by providing a unique solid state television camera system that converts light signals from an object to electrical signals.

SUMMARY OF THE INVENTION

Briefly, the present invention comprises a solid state television camera wherein the light from an object is focused on a plurality of bundles of optical fibers. The optical fibers on each bundle are respectively connected to the light responsive face of a plurality of photo-piezoelectric effect transducer crystals. Each crystal is activated by sound source located at one end of the crystal. As the sound wave travels down the length of a crystal, a voltage occurs across the crystal that is proportional to the light from the particular optical fiber when the travelling sound wave is coincident with that particular optical fiber. As the sound wave travels down the crystal, a plurality of electrical pulses, of varying amplitude in proportion to light intensity, sequentially appear across the crystal that represent one horizontal sweep of the object. A plurality of sweeps may be successively or simultaneously taken of the object by the remaining bundles and corresponding crystals that constitute an electrical representation of the object which may be then transmitted to a distant television receiver. Both monochromatic and color scenes can be converted to electrical signals with the unique solid state camera of the present invention.

STATEMENT OF THE OBJECTS OF THE INVENTION

An object of the present invention is to provide a solid state television camera.

Another object of the present invention is to provide a solid state television camera that is rugged and reliable over a long period of time.

Still another object of the present invention is to provide a television camera that utilizes fiber optics and photo-piezoelectric effect transduction crystals.

Other objects, advantages and novel features of the present invention will become apparent from the following detailed description of the invention when considered in conjunction with the accompanying drawings wherein:

Other objects, advantages and novel features of the present invention will become apparent from the following detailed description of the invention when considered in conjunction with the accompanying drawings wherein:

BRIEF DESCRIPTION OF THE DRAWINGS

Figures 1, 2:
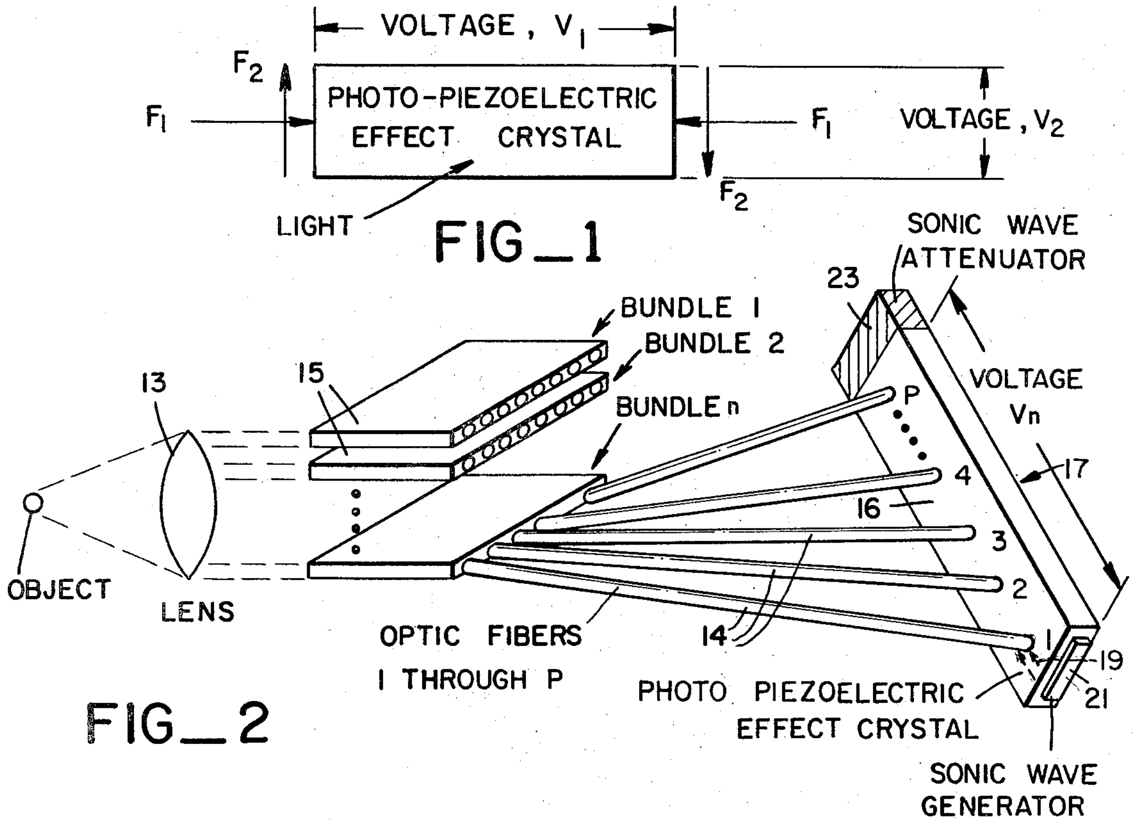
FIG. 1 is a schematic drawing of the basic photo-piezoelectric effect transducer crystal that is employed in the solid state television camera of the present invention.
FIG. 2 is a pictorial illustration of the solid state television camera of the present invention using a plurality of the crystals shown in FIG. 1.
Figure 3:
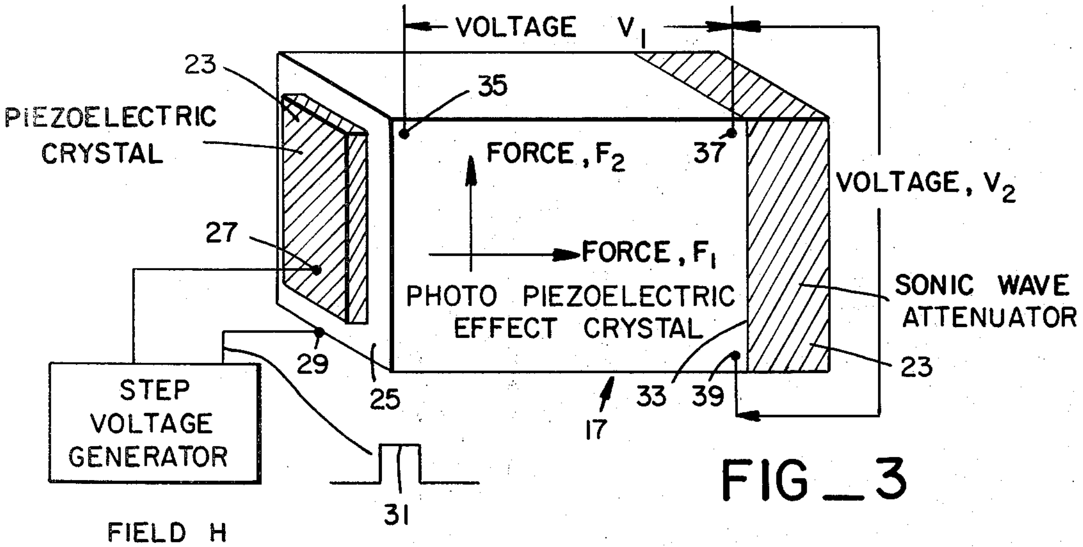
Figure 4:
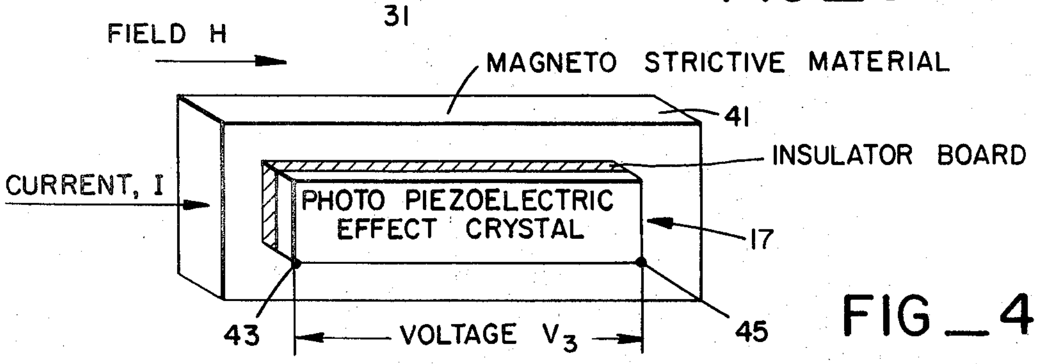

FIG. 1 is a schematic drawing of the basic photo-piezoelectric effect transducer crystal that is employed in the solid state television camera of the present invention;

FIG. 2 is a pictorial illustration of the solid state television camera of the present invention using a plurality of the crystals shown in FIG. 1;

FIG. 3 is a pictorial illustration of the crystal shown in FIGS. 1 and 2 including the sound generator and sound attenuator;

FIG. 4 is an alternative embodiment of the photo-piezoelectric transducer crystal employing a magnetostrictive material to generate mechanical movement of the crystal.

Figure 5:
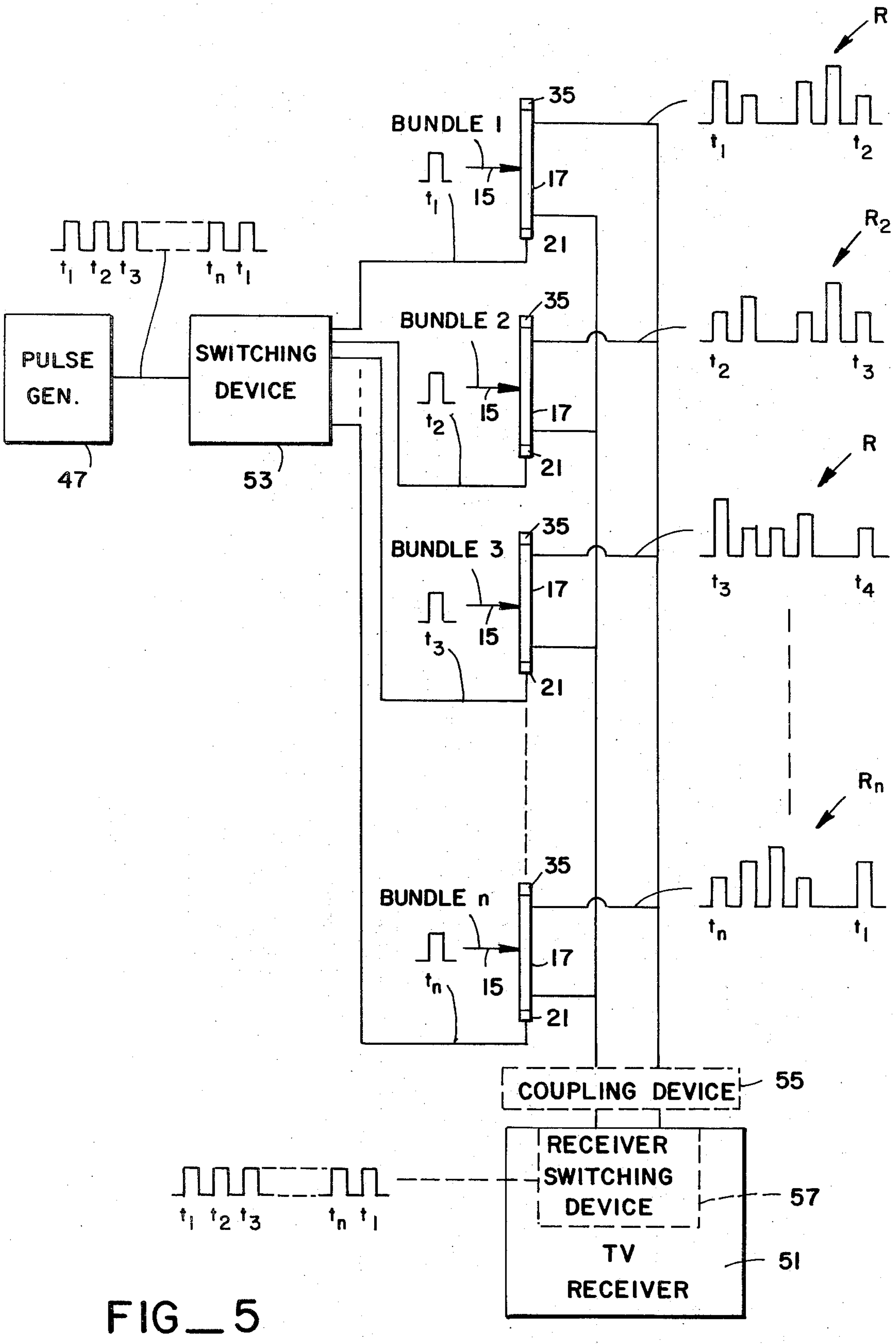
Figure 6:
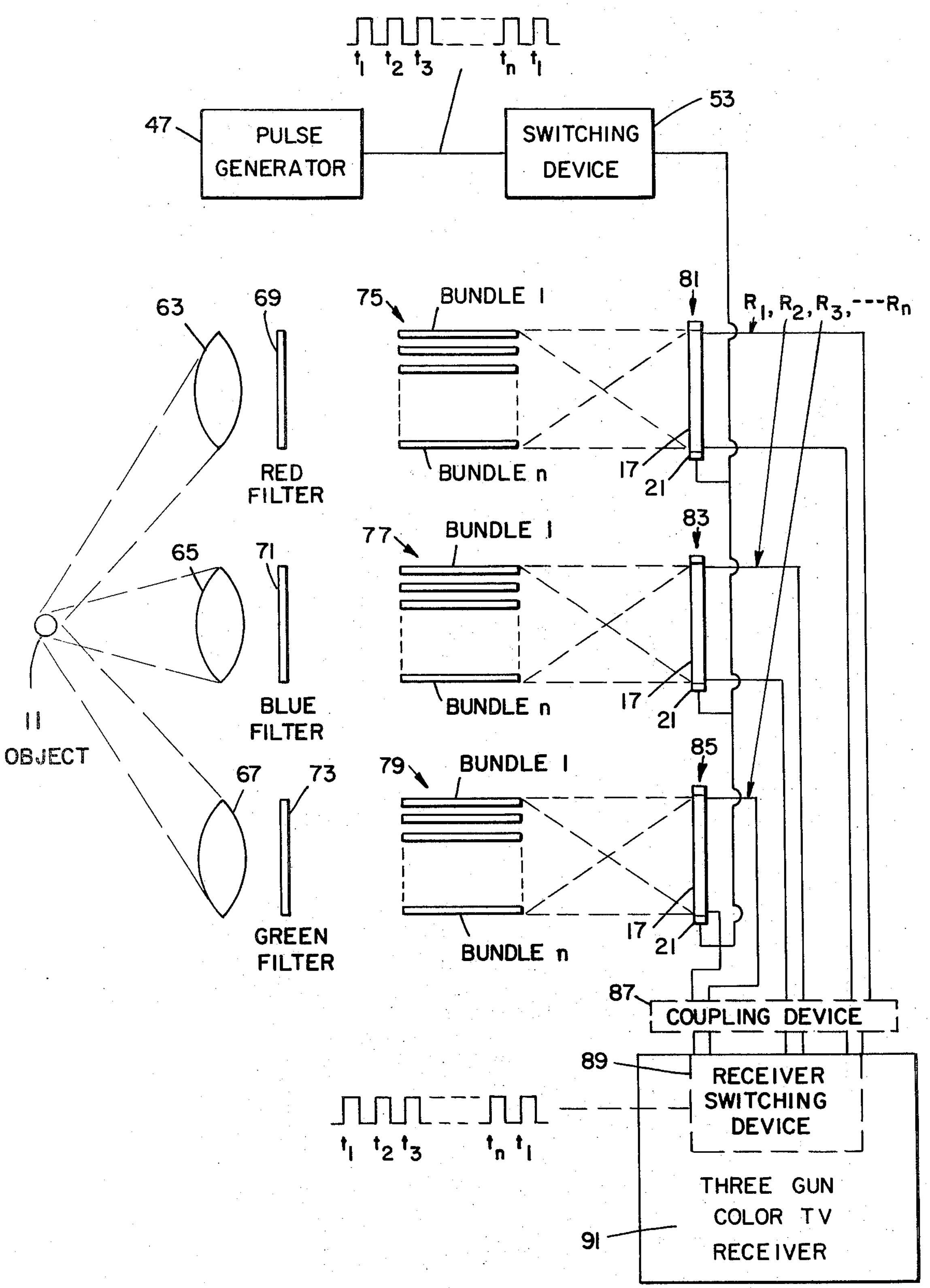

FIG. 5 is a schematic drawing of the overall television system with which the solid state television camera of the present invention may be used; and FIG. 6 is a schematic drawing of another embodiment of the present invention wherein the solid state camera of the present invention provides signals for a three gun television receiver.

DESCRIPTION OF THE PREFERRED EMBODIMENTS

FIG. 1 is a schematic drawing of the basic photo-piezoelectric effect transducer crystal that is employed in the present invention. This crystal is preferably of the N type germanium, silicon or other negatively doped semiconductor, and when stressed with a compressive force $F_1$, then a voltage $V_1$ and $V_2$ will appear across the crystal as illustrated when light impinges upon the surface of the crystal. Also, if a shear force $F_2$ is applied, the voltage also appears at both $V_1$ and $V_2$. This is commonly called the photo-piezoelectric effect transducer crystal.

In FIG. 2 is pictorially illustrated the solid state television camera of the present invention. This basic photo-piezoelectric effect transducer crystal shown in FIG. 1 is utilized in a novel way to build the television camera of FIG. 2 from solid state components and not require a vacuum tube or electron gun as in present devices. In FIG. 2 the light from object 11, which may be any scene having adequate illumination, is focused by lens 13 onto the ends of a plurality of optical transmission fibers 14 or (1 through P) forming bundles 15 or (1 through N). The fibers 14 may be made of glass or plastic or the like and are arranged in horizontal bundles numbered 1 through N as illustrated. Each bundle may have several hundred fibers, numbered 1 through P, and there may be several hundred bundles, numbered 1 through N, stacked one on the other, for television application. The light in the fibers of each bundle is transmitted to the light sensitive surface 16 of photo-piezoelectric effect transducer crystal 17. The ends of the fibers 14 (1 – P) are sequentially positioned, preferably in a straight line, adjacent to the light sensitive surface 16 of crystal 17. Preferably these ends are cemented or otherwise attached to surface 16. To convert the light at the end of each optical fiber (1 – P) in bundle N, for example, to electrical signals, a sonic pulse 19, generated by sound generator 21, is sent through crystal 17. As it travels down the crystal, a voltage is obtained at each optical fiber 1, 2, 3, 4, . . . to P, in turn. The voltage is obtained across the ends of crystal 17 as shown at $V_N$. Thus, the light intensity in each optic fiber is converted to a proportional electrical signal by the coincidence of the photo-piezoelectric effect with the travelling sonic wave. A sonic wave attenuator 23 is employed to prevent the reflection of the sonic wave. Attenuator 23 is attached to the end of the crystal and is made of acoustic absorbing material, such as rubber, and is preferably impedance matched with the crystal 17. By having 525 crystals 17 ($N = 525$), a television signal is obtained for further amplification and transmission to a distant television receiver. The overall system will be more specifically described in relation to FIG. 5 of the drawings.

FIG. 3 more specifically shows the method of generating a travelling sonic pulse in the crystal 17. This may be achieved, for example, by employing piezoelectric crystal 21 that is cemented or deposited on the face 25 of crystal 17. When terminals 27 and 29 have a step pulse 31 of voltage applied, a mechanical force $F_1$ (or $F_2$) is generated in the crystal 17 that moves down from face 25 to face 33 of crystal 17. A sonic wave attenuator 23, made of sound absorbing material, is cemented to face 33 of crystal 17 to prevent reflections of the sonic wave. A voltage $V_1$, taken across terminals 35 and 37, or a voltage $V_2$, taken across terminals 37 and 39, is obtained when light irradiates the crystal at the point where the moving force $F_1$ is located. To improve crystal sensitivity, it should be noted that increasing the temperature of the piezoelectric crystal increases the voltage output for a fixed light excitation.

In FIG. 4 is illustrated a magnetostrictive method of obtaining mechanical forces on crystal 17. Here the crystal 17 is bonded to a magnetostrictive material 41 that changes length (or volume) when a current I passes through it, or has an external field H applied along its major axis. A voltage $V_3$ will appear across the crystal, at terminals 43 and 45, where the sonic wave, caused by the magnetostrictive material, and the light are coincident in crystal 17.

In FIG. 5 is schematically illustrated the overall television system with which the solid state television camera of the present invention may be used. Pulse generator 47 provides a plurality of pulses $t_1, t_2, t_3, \ldots t_n$, which then repeat, and which correspond to the number of bundles 15, crystals 17 and rasters $R_1, R_2, R_3, \ldots R_n$ of the television receiver 51. Switching device 53 is synchronized with pulse generator 47 and sequentially applies the $t_1, t_2, t_3, \ldots t_n$ pulses to the respective sound generator crystals 21 of photo-piezoelectric crystals 17. Therefore, sonic pulses are sequentially applied to crystals 17 which produce sequential raster signals $R_1, R_2, R_3, \ldots R_n$. The pulses in each raster signal correspond to the light in the fibers of that particular bundle 15. These raster signals $R_1, R_2, R_3, \ldots R_n$ are applied in parallel through coupling device 55 to switching device 57 of television receiver 51. Receiver switching device 57 is synchronized to pulse generator 47 and sequentially applies the raster signals $R_1, R_2, R_3, \ldots R_n$ to the electron gun of television receiver 51 which then reproduces the image on the television screen. Coupling device 55 is illustrated in dotted lines and may be a straight through mechanical connection or a transmitter.

In FIG. 6 is schematically illustrated another embodiment of the present invention wherein the solid state camera of the present invention provides signals for a three gun television receiver 91. The light from object 11 is received by lenses 63, 65 and 67. The light from each of these lenses respectively passes through red filter 69, blue filter 71 and green filter 73. The red light from red filter 69 passes into bundle group 75 (having bundles 1, 2, 3, . . . n as shown and described with respect to FIG. 2). The light from blue filter 71 passes into bundle group 77 (having bundles 1, 2, 3, . . . n and is identical to bundle group 75). The light from green filter 73 passes into bundle group 79 (having bundles 1, 2, 3, . . . n and is identical to bundle group 75). The light from each of the bundle groups is transmitted respectively to photo-piezoelectric crystal groups 81, 83 and 85. The pulses $t_1, t_2, t_3, \ldots t_n$ from pulse generator 47 are sequentially applied in parallel to crystal groups 81, 83 and 85. The individual pulses from the pulse generator 47, through switching device 53, are simultaneously applied to corresponding crystals 17 in each of crystal groups 81, 83 and 85. For example, pulse $t_1$ is applied to crystal 17 of crystal group 81 that is connected to bundle 1 of bundle group 75. Simultaneously, pulse $t_1$ is applied to crystal 17 of crystal group 83 that is connected to bundle 1 of bundle group 77. And simultaneously with the above, pulse $t_1$ is applied to crystal 17 of crystal group 85 that is connected to bundle 1 of bundle group 79. From this it can be seen the processing of the red light uses the same equipment as used for processing the white light of the embodiment shown in FIGS. 1, 2, 3 and 5. This same equipment is duplicated for the blue and green light processing. The raster signals $R_1, R_2, R_3, \ldots R_n$ from each of crystal groups 81, 83 and 85 are applied in parallel to coupling device 87 which then applies these signals in parallel to a conventional three gun receiver switching device 89 of three gun color television receiver 91 which then reproduces the image in color on the television screen. Coupling device 87 may be a straight through mechanical connection or a transmitter.

It will be understood by those skilled in the art that all of the photo-piezoelectric crystals 17 in each bundle of crystals may be simultaneously pulsed provided a code generator is operatively connected to the output lines of each of the crystals to identify its particular raster. This would eliminate the switching device 53 but would add a coding device to the camera and a decoding device to the receiver. In this simultaneous pulse technique the pulse generator would still provide a series of pulses where each pulse would perform the same function the pulse series $t_1, t_2, t_3, \ldots t_n$ used in the sequential pulse technique.

What is claimed is:

1. A solid state television camera comprising:

a. at least one bundle comprising a plurality of light transmitting elements;

b. light means for forming a light image on one end of said plurality of elements;

c. at least one photo-piezoelectric effect transducer crystal;

d. the other ends of said light transmitting elements being in operative relation with the light sensitive surface of said at least one photo-piezoelectric effect transducer crystal;

e. generator means for introducing a sonic wave into said at least one crystal; and f. voltage means for sensing the voltage across said at least one crystal when the light from one of said plurality of light transmitting elements occurs at that point in said at least one crystal where said sonic wave also occurs.

2. The device of claim 1 comprising:

a. an attenuator means operatively connected to said crystal for attenuating said sonic wave in said crystal after said wave has transversed said crystal.

3. The device of claim 1 wherein:

a. said light transmitting elements comprise elongated optical transmission fibers.

4. The device of claim 3 wherein:

a. said elongated fibers are positioned such that the ends which receive the light from said light source are in an about common plane and the centers thereof are in an about straight line.

5. The device of claim 4 wherein:

a. said at least one bundle comprises a plurality of bundles wherein the bundles are stacked one upon the other wherein said one ends of all of said elements are in a common plan and said lines through the centers of the elements of each bundle are about parallel with respect to each other.

6. The device of claim 5 wherein:

a. said at least one photo-piezoelectric effect crystal comprises a plurality of photo-piezoelectric effect crystals wherein the other ends of the elements of each of said bundles are respectively in operative relation with the light sensitive surface of respective photo-piezoelectric effect crystals.

7. The device of claim 6 wherein:

a. said generator means provides a series of sonic waves which are sequentially transmitted to successive photo-piezoelectric effect crystals.

8. The device of claim 7 wherein:

a. said voltage means receives the electrical signals from each of said photo-piezoelectric crystals in series; and b. means for transmitting this series of electrical signals to a television receiver.

9. The device of claim 1 wherein:

a. said at least one bundle comprises first, second and third separate bundles wherein each separate bundle includes at least one bundle;

b. said light means transmits light through a first light filter prior to impinging on the one ends of said plurality of elements in said first separate bundle;

c. said light means transmits light through a second light filter prior to impinging on the one ends of said plurality of elements in said second separate bundle;

d. said light means transmits light through a third light filter prior to impinging on the one ends of said plurality of elements in said third separate bundle; and e. said generator means simultaneously introducing three sonic waves into said at least one crystal of each of said first, second and third separate bundles.

10. The device of claim 9 wherein:

a. said first filter transmits only red light;

b. said second filter transmits only blue light; and c. said third filter transmits only green light.

* * * * *